(12) United States Patent
Xu

(10) Patent No.: US 12,283,217 B2
(45) Date of Patent: Apr. 22, 2025

(54) COMPENSATION METHODS AND BRIGHTNESS COMPENSATION DEVICES FOR DISPLAY PANEL

(71) Applicant: Shenzhen China Star Optoelectronics Semiconductor Display Technology Co., Ltd., Guangdong (CN)

(72) Inventor: Ling Xu, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/536,362

(22) Filed: Dec. 12, 2023

(65) Prior Publication Data
US 2024/0355256 A1 Oct. 24, 2024

(30) Foreign Application Priority Data
Apr. 23, 2023 (CN) .......................... 202310451932.7

(51) Int. Cl.
*G09G 3/20* (2006.01)
*G06T 7/00* (2017.01)

(52) U.S. Cl.
CPC .......... *G09G 3/2007* (2013.01); *G06T 7/0002* (2013.01); *G06T 2207/30168* (2013.01); *G09G 2320/0233* (2013.01); *G09G 2320/0285* (2013.01); *G09G 2320/0626* (2013.01); *G09G 2360/16* (2013.01)

(58) Field of Classification Search
CPC .......... G09G 3/2007; G09G 2320/0233; G09G 2320/0285; G09G 2320/0626; G06T 7/0002; G06T 2207/30168; G06T 7/00
See application file for complete search history.

(56) References Cited

U.S. PATENT DOCUMENTS

| 2019/0066628 A1* | 2/2019 | Wang ....................... G09G 5/10 |
| 2023/0012198 A1* | 1/2023 | Hyun ....................... G09G 5/10 |

* cited by examiner

*Primary Examiner* — Roy P Rabindranath

(57) ABSTRACT

Compensation methods and brightness compensation devices for a display panel are provided. The compensation method includes: photographing, by camera components, the display panel displaying a preset grayscale to obtain actual primary subpixel brightness; photographing, by the camera components, the display panel displaying the preset grayscale to obtain actual secondary subpixel brightness; calculating front view compensation values of the areas to be compensated according to a primary subpixel target brightness and the actual primary subpixel brightness; determining a secondary subpixel target brightness according to the primary subpixel target brightness and a brightness relationship lookup table; calculating side view compensation values of the areas to be compensated according to the secondary subpixel target brightness and the actual secondary subpixel brightness; compensating brightness of the primary subpixels and the secondary subpixels in the areas to be compensated according to the front view compensation values and the side view compensation values.

20 Claims, 7 Drawing Sheets

| Actual brightness | Grayscale |
|---|---|
| A1 | B1 |
| A2 | B2 |
| A3 | B3 |
| A4 | B4 |

| Fusion brightness | Primary subpixel brightness | Secondary subpixel brightness |
|---|---|---|
| Z1 | X1 | Y1 |
| Z2 | X2 | Y2 |
| Z3 | X3 | Y3 |

FIG. 9

| Target brightness | |
|---|---|
| Viewing angle | Grayscale |
| E1 | F1 |
| E2 | F2 |
| E3 | F3 |
| E4 | F4 |
| E5 | F5 |

FIG. 10

| Viewing angle | Distortion degree |
|---|---|
| C1 | D1 |
| C2 | D2 |
| C3 | D3 |
| C4 | D4 |

FIG. 11

COMPENSATION METHODS AND BRIGHTNESS COMPENSATION DEVICES FOR DISPLAY PANEL

CROSS-REFERENCE TO RELATED APPLICATION

This application claims priority to Chinese Patent Application No. 202310451932.7, filed on Apr. 23, 2023, the disclosure of which is incorporated herein by reference in its entirety.

TECHNICAL FIELD

The present disclosure relates to the field of display technologies, and in particular, to compensation methods for a display panel and brightness compensation devices for a display panel.

BACKGROUND

With market demand, a size of a display panel is gradually increasing, but due to a viewing angle of a camera, an image captured by the camera and a brightness of the image may be distorted, leading to false compensation. In order to eliminate the influence of the viewing angle of the camera, the Demura compensation technology is introduced in related art. A main method of the Demura compensation technology is to use a plurality of cameras to shoot, generate compensation values corresponding to image positions shot by different cameras, and then splice parts of all positions to obtain front view compensation values of the display panel. Although this method may eliminate image distortion caused by the viewing angle of the camera, it may only eliminate the mura (brightness unevenness) under a front viewing angle, and cannot eliminate the mura under a side viewing angle.

SUMMARY

In view of above, compensation methods for a display panel are provided according to embodiments of the present disclosure. The display panel includes a plurality of areas to be compensated. The display panel also includes primary subpixels and secondary subpixels disposed in each of the areas to be compensate. The compensation method includes: photographing, by a plurality of camera components, the display panel displaying a preset grayscale to obtain a plurality of actual primary subpixel brightness of the display panel, where each of the camera components is arranged to face the areas to be compensated; photographing, by the plurality of camera components, the display panel displaying the preset grayscale to obtain a plurality of actual secondary subpixel brightness of the display panel; calculating a plurality of front view compensation values of the areas to be compensated according to a primary subpixel target brightness and the plurality of actual primary subpixel brightness; determining a secondary subpixel target brightness according to the primary subpixel target brightness and a brightness relationship lookup table, where the brightness relationship lookup table includes a plurality of primary subpixel brightness and a plurality of secondary subpixel brightness, each of the primary subpixel brightness and a corresponding one of the secondary subpixel brightness are configured to make the display panel have the same brightness under front and side viewing angles; calculating a plurality of side view compensation values of the areas to be compensated according to the secondary subpixel target brightness and the plurality of actual secondary subpixel brightness; compensating brightness of the primary subpixels in the areas to be compensated according to the plurality of front view compensation values; and compensating brightness of the secondary subpixels in the areas to be compensated according to the plurality of side view compensation values.

Brightness compensation devices for a display panel are also provided according to embodiments of the present disclosure. The brightness compensation device includes a processor, a memory, and a computer program stored in the memory and executable on the processor, and the processor executes the computer program to implement the steps of any one of the above compensation methods.

BRIEF DESCRIPTION OF THE DRAWINGS

In order to more clearly illustrate the technical solutions in the embodiments of the present disclosure, the drawings needed to be used in the description of the embodiments will be briefly introduced below. Obviously, the drawings in the following description are only some embodiments of the present disclosure. For those skilled in the art, other drawings may also be obtained based on these drawings without exerting creative efforts.

FIG. 9 is a schematic diagram of a relationship between a primary subpixel brightness and a secondary subpixel brightness, which make a display panel have the same brightness under front and side viewing angles according to the present disclosure.

FIG. 10 is a schematic diagram of a relationship between a target brightness, a viewing angle, and a grayscale of an area to be compensated according to the present disclosure.

FIG. 11 is a schematic diagram of a relationship between a distortion degree and a viewing angle of an area to be compensated according to the present disclosure.

DETAILED DESCRIPTION

Figure 1:
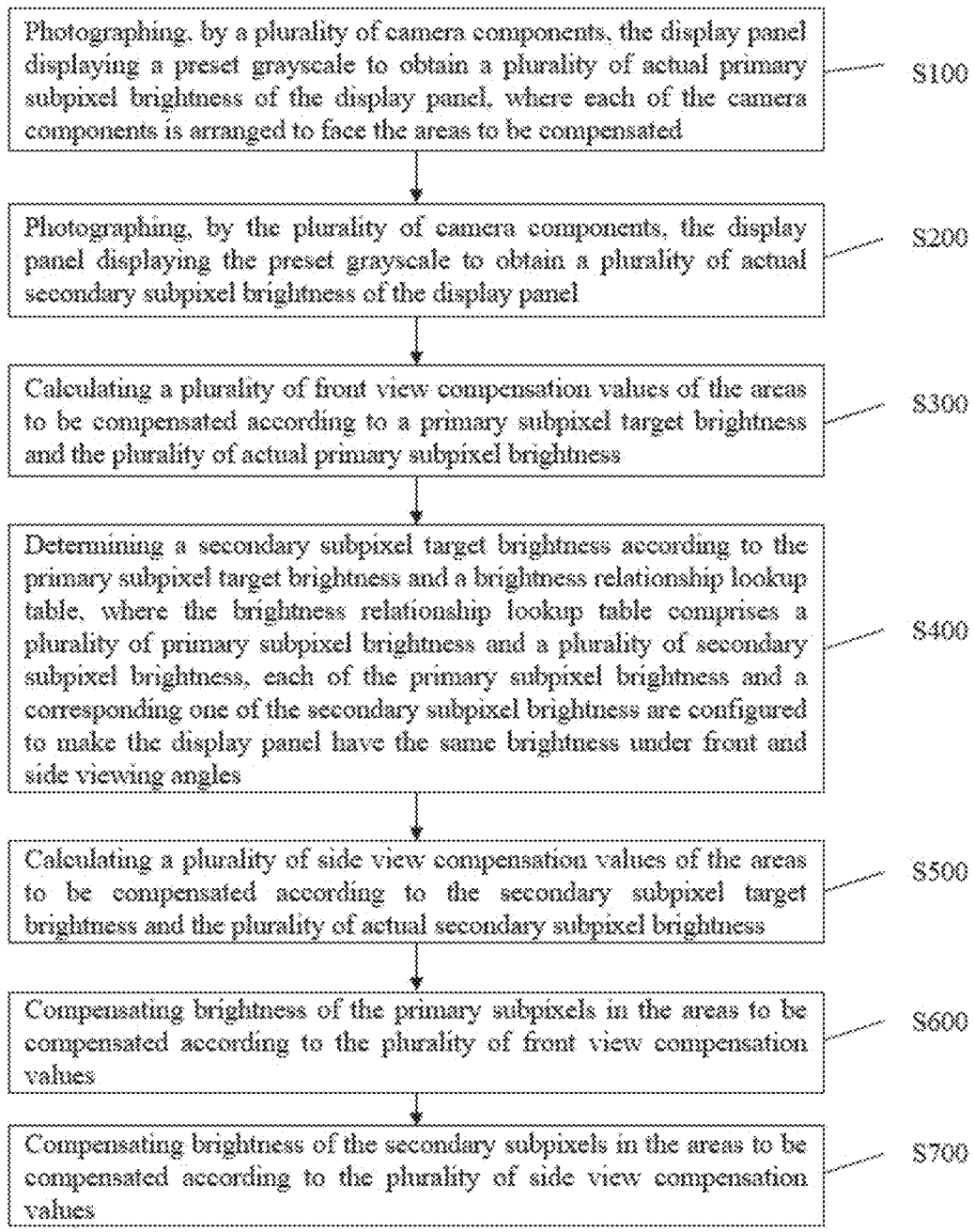
FIG. 1 is a schematic flowchart of a compensation method for a display panel according to some embodiments of the present disclosure.

The technical solutions in the embodiments of the present disclosure will be clearly and completely described below with reference to the accompanying drawings in the embodiments of the present disclosure. Obviously, the described embodiments are only some of the embodiments of the present disclosure, but not all of the embodiments. Based on the embodiments in the present disclosure, all other embodiments obtained by those skilled in the art without making creative efforts fall within the protection scope of the present disclosure.

In the embodiments, the present disclosure provides compensation methods for a display panel, which not only compensates for the mura under the front viewing angle of the display panel, but also compensates for the mura under the side viewing angle of the display panel, so as to relieve the problem that only the mura under the front viewing angle can be eliminated and the mura under the side viewing angle cannot be eliminated in the related art.

The display panel includes a plurality of subpixels. The subpixels include primary subpixels and secondary subpixels. The subpixels emit light under the driving of a driving circuit, so that the display panel displays a specific image. The display panel is divided into m areas to be compensated, and each of the areas to be compensated is provided with n*n subpixels. In some embodiments, a value of n only needs to satisfy the requirement that the area to be compensated becomes a square, that is, a connection line between the subpixels in the area to be compensated becomes a square. In some embodiments, the area to be compensated may also be a circle or other graphics that facilitate the application of the following methods.

The compensation methods include steps S100, S200, S300, S400, S500, S600, and S700.

The step S100 includes: photographing, by a plurality of camera components, a display panel displaying a preset grayscale to obtain a plurality of actual primary subpixel brightness of the display panel, where each camera component is arranged to face the areas to be compensated.

The step S200 includes: photographing, by the plurality of camera components, the display panel displaying the preset grayscale to obtain a plurality of actual secondary subpixel brightness of the display panel.

The step S300 includes: calculating a plurality of front view compensation values of the areas to be compensated according to a primary subpixel target brightness and the plurality of actual primary subpixel brightness.

The step S400 includes: determining a secondary subpixel target brightness according to the primary subpixel target brightness and a brightness relationship lookup table, where the brightness relationship lookup table includes a plurality of primary subpixel brightness and a plurality of secondary subpixel brightness, each primary subpixel brightness and the corresponding secondary subpixel brightness are configured to make the display panel have the same brightness under front and side viewing angles.

The step S500 includes: calculating a plurality of side view compensation values of the areas to be compensated according to the secondary subpixel target brightness and the plurality of actual secondary subpixel brightness.

The step S600 includes: compensating brightness of the primary subpixels in the areas to be compensated according to the plurality of front view compensation values.

The step S700 includes: compensating brightness of the secondary subpixels in the areas to be compensated according to the plurality of side view compensation values.

In the embodiments, the plurality of actual primary subpixel brightness and the plurality of actual secondary subpixel brightness are obtained through the plurality of camera components; and then the primary subpixel target brightness and the secondary subpixel target brightness, which make the display panel have the same brightness under the front and side viewing angles, are determined according to the brightness relationship lookup table; and then the plurality of front view compensation values of the areas to be compensated are calculated based on the primary subpixel target brightness and the plurality of actual primary subpixel brightness, and the plurality of side view compensation value of the areas to be compensated are calculated based on the secondary subpixel target brightness and the plurality of actual secondary subpixel brightness; and at last the primary subpixels and the secondary subpixels in the areas to be compensated are respectively compensated according to the plurality of front view compensation values and the plurality of side view compensation values. In this way, the mura compensation under the side viewing angle is completed during the mura compensation under the front viewing angle of the display panel.

It should be noted that the steps of S100, S200, S300, S400, S500, S600, and S700 illustrating processes of the compensation method of the present disclosure are only to facilitate the understanding of method processes, and are not intended to limit the specific step sequence of the brightness compensation method of the present disclosure. The brightness compensation method of the present disclosure may also have other step sequences that can achieve the purpose of the present disclosure. For example, the step S100 and the step S200 may be completed in a same image taking step in some embodiments, and sequences of S600 and S700 may also be interchangeable. Therefore, the present disclosure has a variety of step sequences that may achieve the purpose of the invention of the present disclosure, which is not limited here.

Figure 2:
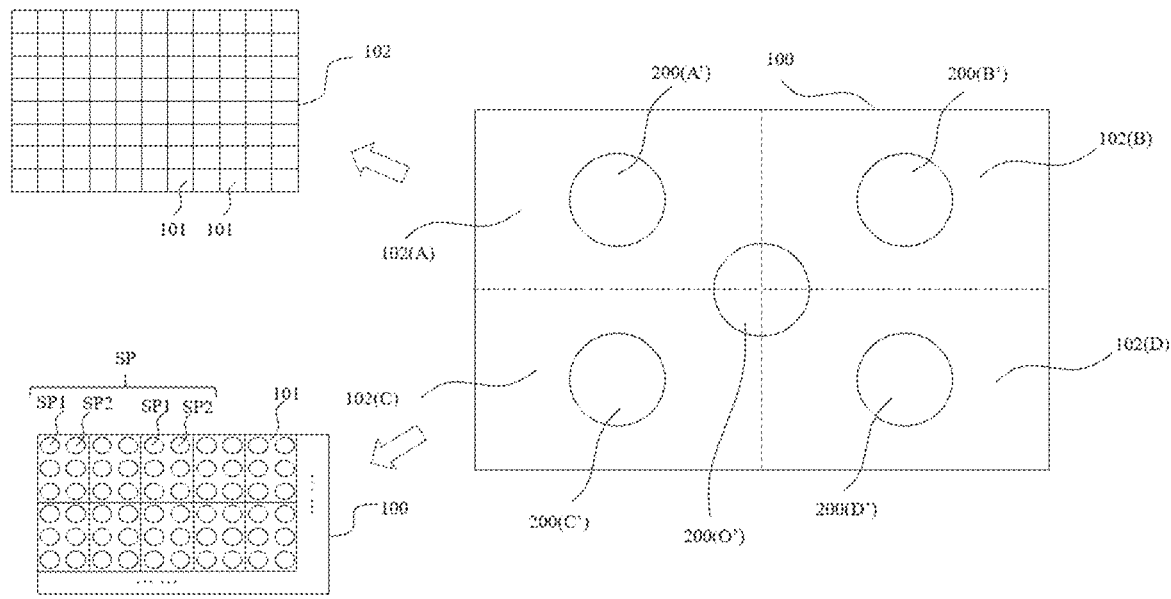
FIG. 2 is a schematic diagram of positions of camera components according to some embodiments of the present disclosure.
Figure 3:
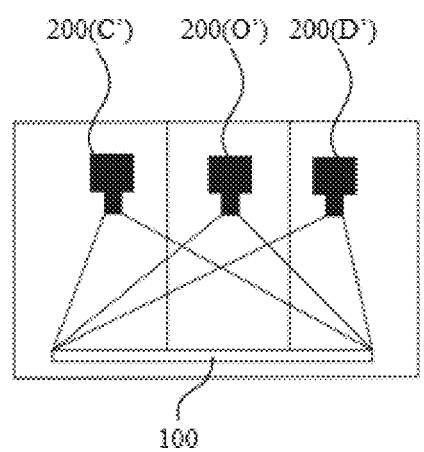
FIG. 3 is another schematic diagram of positions of camera components according to some embodiments of the present disclosure.
Figure 4:
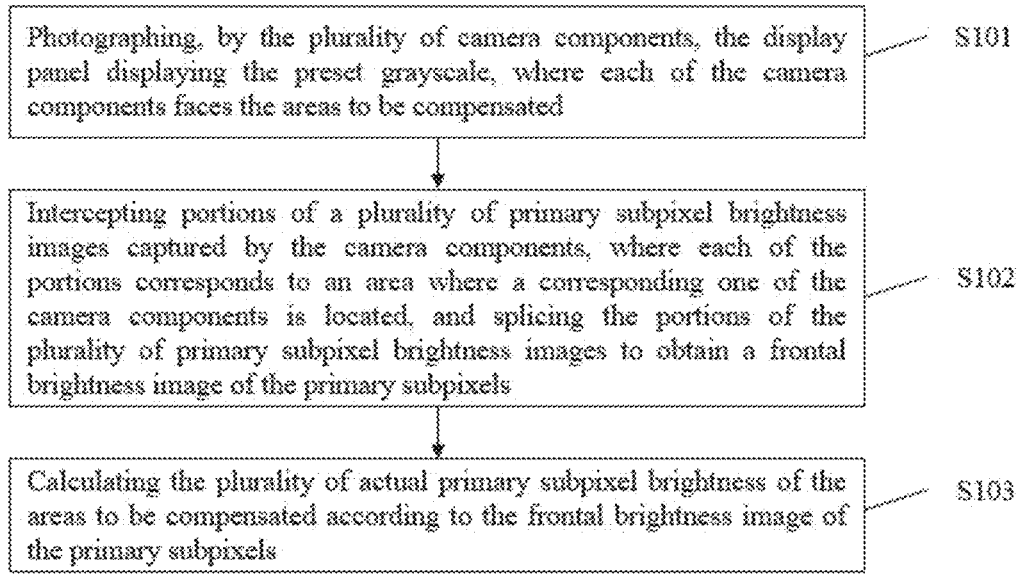
FIG. 4 is a schematic flowchart of a step S100 according to some embodiments of the present disclosure.

In some embodiments, in order to obtain more accurate actual primary subpixel brightness, the plurality of camera components are distributed in the display area of the display panel to enable a viewing angle of each camera component relative to the corresponding area to be compensated is less than a preset viewing angle (that is, facing the area to be compensated). As illustrated in FIG. 2 and FIG. 3, the display panel 100 includes a plurality of subpixels SP, and the subpixels SP include primary subpixels SP1 and secondary subpixels SP2; in the display panel 100, some of the plurality of areas to be compensated 101 constitute one display sub-area 102. The display panel 100 includes four display sub-areas 102 (A, B, C, and D). Each display sub-area 102 corresponds to one of the camera components 200 (A', B', C', D'). As shown in FIG. 4, the S100 includes steps of S101, S102, and S103.

The step S101 includes: photographing, by the plurality of camera components, the display panel displaying the preset grayscale, where each camera component faces the areas to be compensated. It can be understood that each camera component may photograph the entire display area of the display panel, or only the corresponding ones of the areas to be compensated. At the same time, when calculating a plurality of primary subpixel brightness, only the primary subpixels in the areas to be compensated are controlled to emit light, and the secondary subpixels do not emit light. The same is true when calculating a plurality of secondary subpixel brightness as described below.

The step S102 includes: intercepting portions of a plurality of primary subpixel brightness images captured by the camera components, where each portion corresponds to an area where the corresponding camera component is located; and splicing the intercepted portions of the plurality of primary subpixel brightness images to obtain a frontal brightness image of the primary subpixels.

Since each display sub-area is provided with one camera component, so that the frontal brightness image of the entire display area of the display panel can be obtained by intercepting and splicing the portions of the primary subpixel brightness images captured by the camera components respectively corresponding to the areas where the camera components are located.

For example, in the primary subpixel brightness image taken by the camera component A', only a portion corresponding to the display sub-area A is retained; in the primary subpixel brightness image taken by the camera component B', only a portion corresponding to the display sub-area B is retained; in the primary subpixel brightness image taken by the component C', only a portion corresponding to the display sub-area C is retained; and in the primary subpixel brightness image taken by the camera component D', only a portion corresponding to the display sub-area D is retained. The retained portions are spliced to form the frontal brightness image of the primary subpixels.

The step S103 includes: calculating the plurality of actual primary subpixel brightness of the areas to be compensated according to the frontal brightness image of the primary subpixels.

The plurality of actual primary subpixel brightness of the areas to be compensated are obtained by using a brightness analyzer or other device with a brightness identification function to identify the frontal brightness image of the primary subpixels obtained in the step S102. In some embodiments, the camera component may also include a component with a brightness identification function. How to identify the brightness of the subpixels based on the brightness image is a conventional technical means used by those skilled in the art, and will not be described again here.

Figure 5:
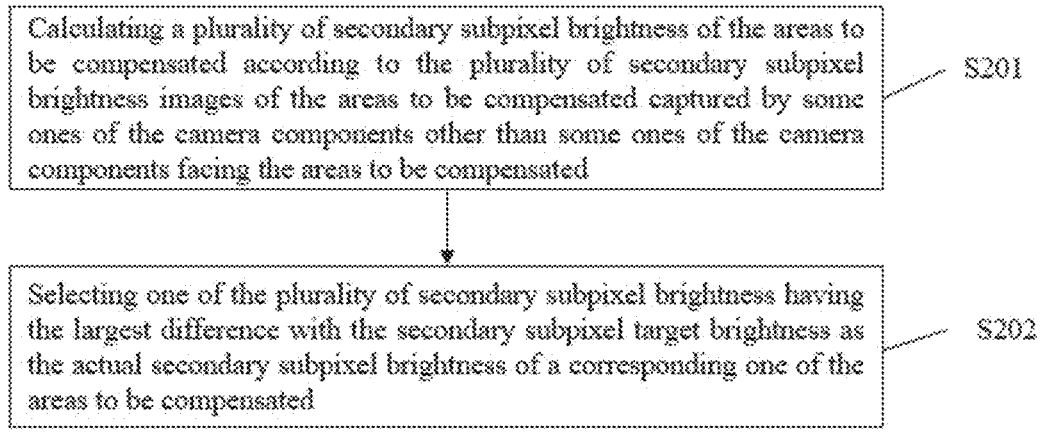
FIG. 5 is a schematic flowchart of a step S200 according to some embodiments of the present disclosure.

In some embodiments, in order to obtain the plurality of actual secondary subpixel brightness under different viewing angles, as shown in FIG. 5, the step S200 may specifically include: calculating the plurality of actual secondary subpixel brightness of the areas to be compensated according to a plurality of secondary subpixel brightness images of the areas to be compensated captured by other camera components other than the camera components facing the areas to be compensated.

Referring to the previous embodiments, when calculating the actual secondary subpixel brightness of the areas to be compensated in the display sub-area A, only the secondary subpixel brightness images captured by the camera components B', C', and D' respectively corresponding to the display sub-areas B, C, and D are referred to. It can be understood that in other embodiments, reference may also be made to the secondary subpixel brightness image captured by the camera component A'.

Therefore, in some embodiments, the above-mentioned specific step S200 includes steps of S201 and S202.

The step S201 includes: calculating a plurality of secondary subpixel brightness of the areas to be compensated according to the plurality of secondary subpixel brightness images of the areas to be compensated captured by other camera components other than the camera components facing the areas to be compensated.

Since the camera components have different viewing angles relative to the areas to be compensated, the plurality of secondary subpixel brightness obtained by the camera components are also different. Therefore, corresponding to the above embodiments, each secondary subpixel in the areas to be compensated in the display sub-area A corresponds to three secondary subpixel brightness.

The step S202 includes: selecting one of the plurality of secondary subpixel brightness having the largest difference with the secondary subpixel target brightness as the actual secondary subpixel brightness of the corresponding area to be compensated.

For example, a difference between the secondary subpixel brightness of one secondary subpixel in the area to be compensated corresponding to the brightness image captured by the camera component B' and the secondary subpixel target brightness is 2 nit, a difference between the secondary subpixel brightness of one secondary subpixel in the area to be compensated corresponding to the brightness image captured by the camera component C' and the secondary subpixel target brightness is 5 nit, and a difference between the secondary subpixel brightness of one secondary subpixel in the area to be compensated corresponding to the brightness image captured by the camera component D' and the secondary subpixel target brightness is 3 nit, thus, the secondary subpixel brightness corresponding to the brightness image captured by the camera component C' is taken as the actual secondary subpixel brightness of the secondary subpixel. It can be understood that since a display level of the display panel is determined based on the worst mura, the above steps may improve the display level of the display panel.

In some embodiments, five camera components may also be provided, as illustrated in FIG. 2. Different from the above embodiments, a camera component O' is also provided in a middle area O of the display panel. The present disclosure does not place a limit on the number of camera components. The actual primary subpixel brightness and the actual secondary subpixel brightness only need to correspondingly follow the ideas expressed in the above embodiments.

In some embodiments, the step S300 includes: according to the primary subpixel target brightness and the plurality of actual primary subpixel brightness, calculating the plurality of front view compensation values of the areas to be compensated based on a second brightness compensation formula. The second brightness compensation formula is:

$$W_2 = N_2 * center_2 + (1 - N_2) * other_2,$$

where $W_2$ is the front view compensation value, $N_2$ is a weight coefficient of the primary subpixel target brightness, $center_2$ is the primary subpixel target brightness, and $other_2$ is the actual primary subpixel brightness.

In some embodiments, the primary subpixel target brightness is the brightness of the areas to be compensated located in the middle area of the display panel. It can be understood that the front view compensation value $W_2$ obtained according to the above second brightness compensation formula is a brightness value, which represents a desired brightness of the primary subpixels in the corresponding area to be compensated. At the same time, those skilled in the art may also set another primary subpixel target brightness as needed.

In some embodiments, each of the primary subpixel target brightness, the secondary subpixel target brightness, the actual primary subpixel brightness, the actual secondary subpixel brightness, etc. refers to an average brightness of the subpixels in the corresponding area to be compensated. For example, the actual primary subpixel brightness of the area to be compensated obtained by the camera component is an average value of the brightness of all primary subpixels in the area to be compensated.

In some embodiments, the weight coefficient $N_2$ of the primary subpixel target brightness may range between 0.1 and 1, such as be 0.1, 0.2, 0.5, 0.9, etc. And those skilled in the art may select appropriate weight coefficients according to the conditions of the display panel.

The above embodiment describes the calculation of the front view compensation value according to the primary subpixel target brightness, where the primary subpixel target brightness may be the brightness of any area to be compensated in the display panel, or may also be another preset target brightness. In order to make the display panel have the same brightness under the front and side viewing angles, the primary subpixel brightness and the secondary subpixel brightness of the same area to be compensated need to satisfy a corresponding relationship. This relationship may be experimentally measured by skilled personnel or obtained from existing databases, and is not limited in the present disclosure. In the embodiments, the corresponding relationship between the primary subpixel brightness and the secondary subpixel brightness may be a brightness relationship table shown in FIG. 9, where a fusion brightness represents an actual brightness of the display panel with a corresponding matching of the primary subpixel brightness and the secondary subpixel brightness under the front and side viewing angles.

Therefore, after the primary subpixel target brightness is determined in the above embodiments, the secondary subpixel target brightness that meets the above requirements may be found according to the brightness relationship table.

Therefore, in step S400, the secondary subpixel target brightness is obtained according to the primary subpixel target brightness and the brightness relationship lookup table, where the brightness relationship lookup table includes the plurality of primary subpixel brightness and the plurality of secondary subpixel brightness, and each primary subpixel brightness and the corresponding secondary subpixel brightness make the display panel have the same brightness under the front and side viewing angles.

In some embodiments, the step S500 includes: according to the secondary subpixel target brightness and the plurality of actual secondary subpixel brightness, calculating the plurality of side view compensation values of the areas to be compensated based on a first brightness compensation formula. The first brightness compensation formula is:

$$W_1 = N_1 * center_1 + (1 - N_1) * other_1,$$

where $W_1$ is the side view compensation value, $N_1$ is a weight coefficient of the secondary subpixel target brightness, $center_1$ is the secondary subpixel target brightness, and $other_1$ is the actual secondary subpixel brightness.

The calculation of the side view compensation value and the requirements of the corresponding parameters may refer to the front view compensation value in the above embodiments, and will not be described again here.

Figure 6:
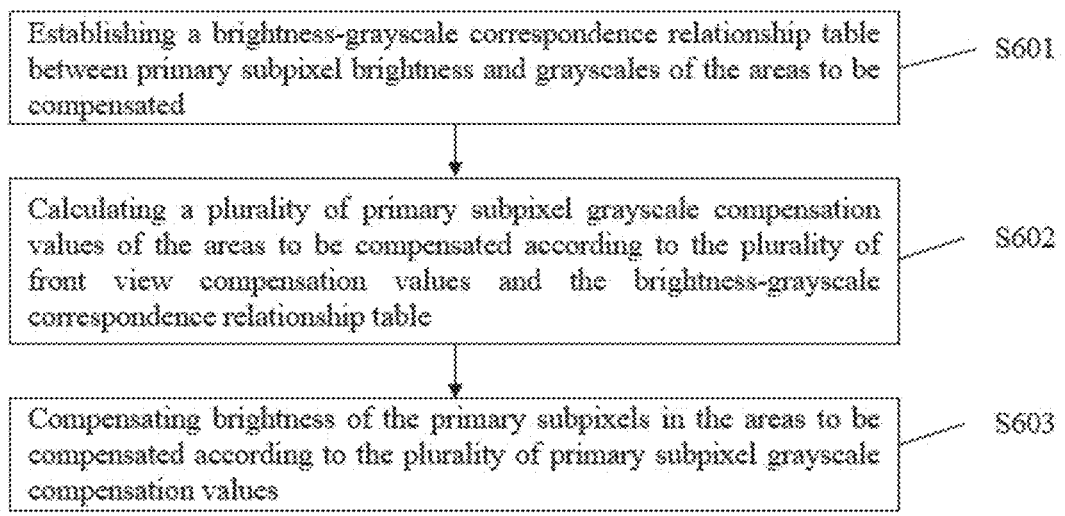
FIG. 6 is a schematic flowchart of a step S600 according to some embodiments of the present disclosure.

In some embodiments, as shown in FIG. 6, the step S600 includes steps of S601, S602, and S603.

The step S601 includes: establishing a brightness-grayscale correspondence relationship table between the primary subpixel brightness and grayscales of the areas to be compensated.

Figures 7, 8:
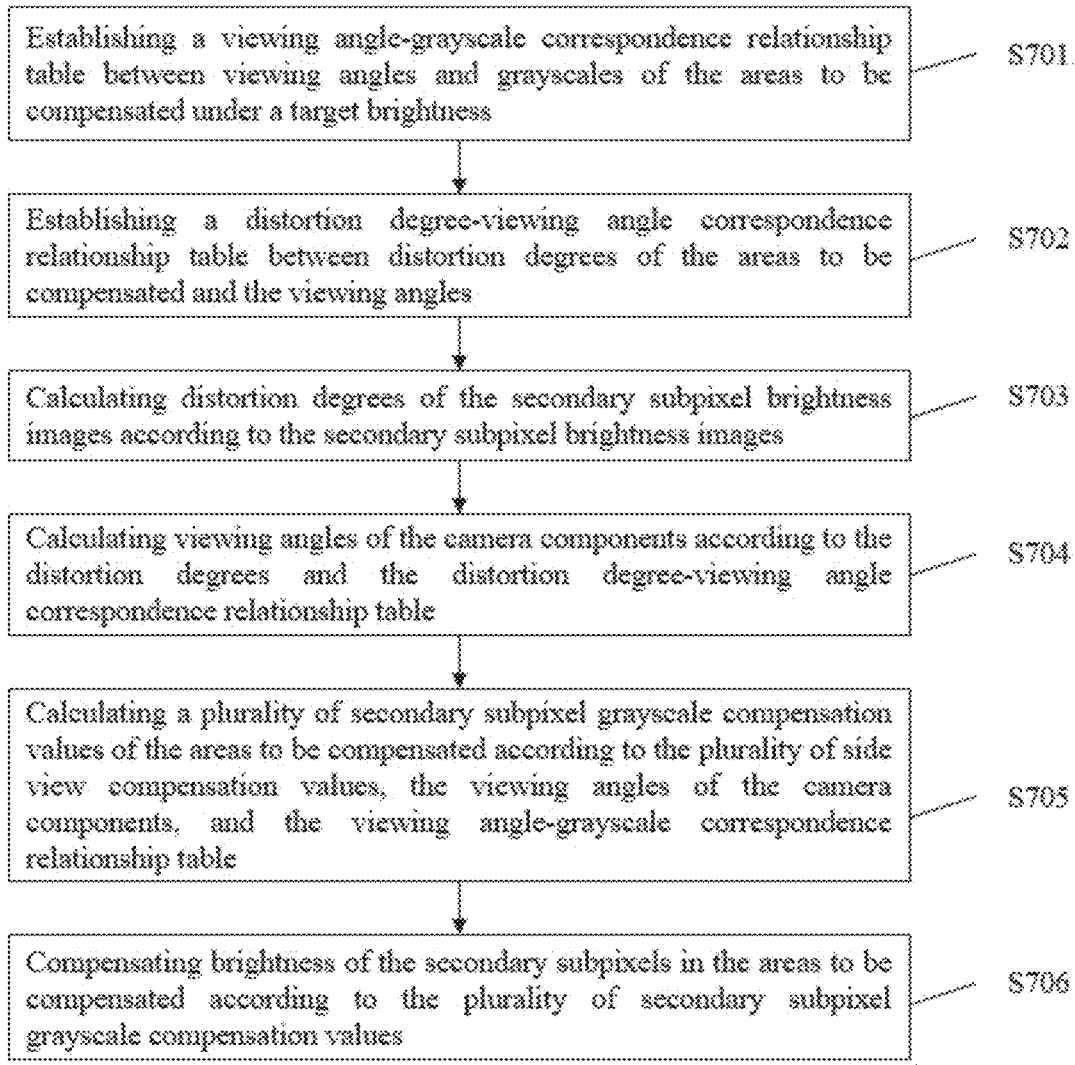
FIG. 7 is a schematic flowchart of a step S700 according to some embodiments of the present disclosure.
FIG. 8 is a schematic diagram of a relationship between an actual brightness and a grayscale of an area to be compensated according to the present disclosure.

For the display panel after operated, preset brightness of some subpixels may not match the preset grayscale due to various reasons. For example, a driving transistor corresponding to the subpixel does not have an expected driving current at a corresponding grayscale voltage due to aging. Thus, when the display panel displays the preset grayscale, the brightness of some subpixels cannot reach the preset brightness, that is, there is a brightness difference in the display panel. Therefore, when processing the mura compensation under the front viewing angle, it is necessary to establish the brightness-grayscale correspondence relationship table between the primary subpixel brightness and the grayscales of the areas to be compensated. As shown in FIGS. 8, A1, A2, A3, and A4 respectively indicate the actual brightness of the primary subpixels in the areas to be compensated displayed under corresponding grayscales B1, B2, B3, and B4.

The step S602 includes: calculating a plurality of primary subpixel grayscale compensation values of the areas to be compensated according to the plurality of front view compensation values and the brightness-grayscale correspondence relationship table.

According to the front view compensation value obtained in the above embodiments, a grayscale corresponding to a desired brightness of the area to be compensated can be obtained, so that a grayscale voltage corresponding to the grayscale is used as the primary subpixel grayscale compensation value to compensate the primary subpixels in the area to be compensated.

The step S603 includes: compensating brightness of the primary subpixels in the areas to be compensated according to the plurality of primary subpixel grayscale compensation values.

Compensating brightness of the primary subpixels in the area to be compensated according to the grayscale compensation value may include applying the grayscale voltage obtained in the above embodiments to the primary subpixels in the area to be compensated.

In some embodiments, as shown in FIG. 7, the step S700 includes steps of S701, S702, S703, S704, S705, and S706.

The step S701 includes: establishing a viewing angle-grayscale correspondence relationship table between the viewing angles and the grayscales of the areas to be compensated under the target brightness.

Different from the compensation of the primary subpixels mentioned above, when the secondary subpixels are compensated, the aging and other reasons of the secondary subpixels may cause the actual brightness captured by the camera components to be different from the brightness corresponding to the preset grayscale, and the brightness captured by the camera components may be distorted due to the influence of the viewing angle of the camera component relative to the area to be compensated. Thus, when establishing the corresponding relationship between the actual brightness and the grayscale of the secondary subpixels, the influence of the viewing angle should also be considered. As shown in FIG. 10, it shows that the required grayscales corresponding to the target brightness are also different due to different viewing angles.

The relationship between the brightness and the viewing angle of the secondary subpixels has been described above. Therefore, when calculating the compensation value of the secondary subpixels, the viewing angle of the camera component relative to the area to be compensated should first be obtained.

The step S702 includes: establishing a distortion degree-viewing angle correspondence relationship table between distortion degrees of the areas to be compensated and the viewing angles. Those skilled in the art know that when the viewing angles of the camera component relative to the target area are different, a shape of the subpixels in the target area in the brightness image is also distorted to different degrees. Therefore, the viewing angle-grayscale correspondence relationship table may be established according to the relationships between the distortion degrees and the viewing angles, as shown in FIG. 11.

The step S703 includes: calculating distortion degrees of the secondary subpixel brightness images according to the secondary subpixel brightness images.

The step S704 includes: calculating the viewing angles of the camera components according to the distortion degrees and the distortion degree-viewing angle correspondence relationship table.

When the brightness image is obtained through the camera component, the distortion degree of the corresponding area to be compensated relative to the corresponding camera component is obtained according to the brightness image, and then the viewing angle of the camera component relative to the corresponding area to be compensated can be known according to the established distortion degree-viewing angle correspondence relationship table.

The step S705 includes: calculating the plurality of secondary subpixel grayscale compensation values of the areas to be compensated according to the plurality of side view compensation values, the viewing angles of the camera components, and the viewing angle-grayscale correspondence relationship table. After calculating the viewing angle of the camera component, based on the aforementioned side view compensation value (that is, the desired brightness of the secondary subpixels in the area to be compensated) and the viewing angle-grayscale correspondence relationship table, a grayscale corresponding to the desired brightness (side view compensation value) of the secondary subpixels in the area to be compensated under the viewing angle can be known.

The step S706 includes: compensating brightness of the secondary subpixels in the areas to be compensated according to the plurality of secondary subpixel grayscale compensation values.

According to the actual grayscale required by the above secondary subpixels to achieve the side view compensation value, the grayscale voltage required by the secondary subpixels can be known. The mura compensation under the side viewing angle may be completed by applying the grayscale to the secondary subpixels in the area to be compensated.

In some embodiments, the actual primary subpixel brightness of the area to be compensated is the average brightness of the plurality of primary subpixels in the area to be compensated, and the actual secondary subpixel brightness of the area to be compensated is the average brightness of the plurality of secondary subpixels in the area to be compensated.

In some embodiments, the compensation method further includes storing the obtained front view compensation value and side view compensation value, such as storing them in a storage module of the display panel.

Figure 12:
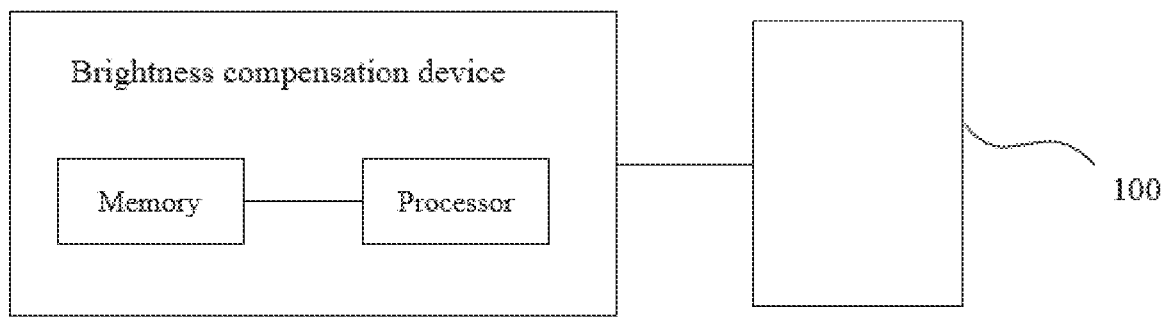
FIG. 12 is a block schematic diagram of a brightness compensation device according to the present disclosure.

As illustrated in FIG. 12, the present disclosure also provides brightness compensation devices for a display panel 100. The brightness compensation device includes a processor, a memory, and a computer program stored in the memory and executable on the processor. The processor executes the computer program to implement the above steps in the compensation method for the display panel 100 described in the embodiments.

In summary, although the present disclosure has been disclosed above in terms of preferred embodiments, the above preferred embodiments are not intended to limit the present disclosure. Those of ordinary skill in the art may make various modifications without departing from the spirit and scope of the present disclosure. Therefore, the protection scope of the present disclosure shall be subject to the scope defined by the claims.

What is claimed is:

1. A compensation method for a display panel, the display panel comprising a plurality of areas to be compensated, and primary subpixels and secondary subpixels disposed in each of the areas to be compensated, and the compensation method comprising:
   photographing, by a plurality of camera components, the display panel displaying a preset grayscale to obtain a plurality of actual primary subpixel brightness of the display panel, wherein each of the camera components is arranged to face the areas to be compensated;
   photographing, by the plurality of camera components, the display panel displaying the preset grayscale to obtain a plurality of actual secondary subpixel brightness of the display panel;
   calculating a plurality of front view compensation values of the areas to be compensated according to a primary subpixel target brightness and the plurality of actual primary subpixel brightness;
   determining a secondary subpixel target brightness according to the primary subpixel target brightness and a brightness relationship lookup table, wherein the brightness relationship lookup table comprises a plurality of primary subpixel brightness and a plurality of secondary subpixel brightness, each of the primary subpixel brightness and a corresponding one of the secondary subpixel brightness are configured to make the display panel have the same brightness under front and side viewing angles;
   calculating a plurality of side view compensation values of the areas to be compensated according to the secondary subpixel target brightness and the plurality of actual secondary subpixel brightness;
   compensating brightness of the primary subpixels in the areas to be compensated according to the plurality of front view compensation values; and
   compensating brightness of the secondary subpixels in the areas to be compensated according to the plurality of side view compensation values.

2. The compensation method for the display panel according to claim 1, wherein the step of photographing, by a plurality of camera components, the display panel displaying the preset grayscale to obtain the plurality of actual secondary subpixel brightness of the display panel comprises:
   calculating the plurality of actual secondary subpixel brightness of the areas to be compensated according to a plurality of secondary subpixel brightness images of the areas to be compensated captured by some ones of the camera components other than some ones of the camera components facing the areas to be compensated.

3. The compensation method for the display panel according to claim 2, wherein the step of calculating the plurality of actual secondary subpixel brightness of the areas to be compensated according to the plurality of secondary subpixel brightness images of the areas to be compensated captured by some ones of the camera components other than some ones of the camera components facing the areas to be compensated comprises:

calculating a plurality of secondary subpixel brightness of the areas to be compensated according to the plurality of secondary subpixel brightness images of the areas to be compensated captured by some ones of the camera components other than some ones of the camera components facing the areas to be compensated; and selecting one of the plurality of secondary subpixel brightness having the largest difference with the secondary subpixel target brightness as the actual secondary subpixel brightness of a corresponding one of the areas to be compensated.

4. The compensation method for the display panel according to claim 2, wherein the step of compensating the brightness of the secondary subpixels in the areas to be compensated according to the plurality of side view compensation values comprises:

establishing a viewing angle-grayscale correspondence relationship table between viewing angles and grayscales of the areas to be compensated under a target brightness;

establishing a distortion degree-viewing angle correspondence relationship table between distortion degrees of the areas to be compensated and the viewing angles;

calculating distortion degrees of the secondary subpixel brightness images according to the secondary subpixel brightness images;

calculating viewing angles of the camera components according to the distortion degrees and the distortion degree-viewing angle correspondence relationship table;

calculating a plurality of secondary subpixel grayscale compensation values of the areas to be compensated according to the plurality of side view compensation values, the viewing angles of the camera components, and the viewing angle-grayscale correspondence relationship table; and compensating the brightness of the secondary subpixels in the areas to be compensated according to the plurality of secondary subpixel grayscale compensation values.

5. The compensation method for the display panel according to claim 1, wherein the step of calculating the plurality of side view compensation values of the areas to be compensated according to the secondary subpixel target brightness and the plurality of actual secondary subpixel brightness comprises:

according to the secondary subpixel target brightness and the plurality of actual secondary subpixel brightness, calculating the plurality of side view compensation values of the areas to be compensated based on a first brightness compensation formula, wherein the first brightness compensation formula is:

$$W_1 = N_1 * center_1 + (1 - N_1) * other_1,$$

where $W_1$ is one of the side view compensation values, $N_1$ is a weight coefficient of the secondary subpixel target brightness, $center_1$ is the secondary subpixel target brightness, and $other_1$ is the actual secondary subpixel brightness.

6. The compensation method for the display panel according to claim 1, wherein the step of photographing, by the plurality of camera components, the display panel displaying the preset grayscale to obtain the plurality of actual primary subpixel brightness of the display panel comprises:

photographing, by the plurality of camera components, the display panel displaying the preset grayscale, wherein each of the camera components faces the areas to be compensated; and intercepting portions of a plurality of primary subpixel brightness images captured by the camera components, where each of the portions corresponds to an area where a corresponding one of the camera components is located;

splicing the portions of the plurality of primary subpixel brightness images to obtain a frontal brightness image of the primary subpixels; and calculating the plurality of actual primary subpixel brightness of the areas to be compensated according to the frontal brightness image of the primary subpixels.

7. The compensation method for the display panel according to claim 1, wherein the step of calculating the plurality of front view compensation values of the areas to be compensated according to the primary subpixel target brightness and the plurality of actual primary subpixel brightness comprises:

according to the primary subpixel target brightness and the plurality of actual primary subpixel brightness, calculating the plurality of front view compensation values of the areas to be compensated based on a second brightness compensation formula, wherein the second brightness compensation formula is:

$$W_2 = N_2 * center_2 + (1 - N_2) * other_2,$$

where $W_2$ is one of the front view compensation values, $N_2$ is a weight coefficient of the primary subpixel target brightness, $center_2$ is the primary subpixel target brightness, and $other_2$ is the actual primary subpixel brightness.

8. The compensation method for the display panel according to claim 1, wherein the step of compensating the brightness of the primary subpixels in the areas to be compensated according to the plurality of front view compensation values comprises:

establishing a brightness-grayscale correspondence relationship table between primary subpixel brightness and grayscales of the areas to be compensated;

calculating a plurality of primary subpixel grayscale compensation values of the areas to be compensated according to the plurality of front view compensation values and the brightness-grayscale correspondence relationship table; and compensating the brightness of the primary subpixels in the areas to be compensated according to the plurality of primary subpixel grayscale compensation values.

9. The compensation method for the display panel according to claim 1, wherein the actual primary subpixel brightness of each of the areas to be compensated is an average brightness of the primary subpixels in a corresponding one of the areas to be compensated, and the actual secondary subpixel brightness of each of the areas to be compensated is an average brightness of the secondary subpixels in a corresponding one of the areas to be compensated.

10. The compensation method for the display panel according to claim 1, wherein viewing angles of the camera components relative to the areas to be compensated for photographing the display panel are less than a preset viewing angle facing the areas to be compensated.

11. The compensation method for the display panel according to claim 1, wherein the display panel comprises a plurality of display sub-areas, each of the display sub-areas is provided with some of the primary subpixels and some of the secondary subpixels, and each of the display sub-areas corresponds to one of the camera components.

12. The compensation method for the display panel according to claim 1, wherein the primary subpixel target brightness is a brightness of any one of the areas to be compensated or a preset target brightness.

13. A brightness compensation device for a display panel, the display panel comprising a plurality of areas to be compensated, the display panel also comprising primary subpixels and secondary subpixels disposed in each of the areas to be compensated, and the brightness compensation device comprising:
    a processor;
    a memory; and
    a computer program, stored in the memory and executable on the processor,
    wherein the processor executes the computer program to implement following steps comprising:
    photographing, by a plurality of camera components, the display panel displaying a preset grayscale to obtain a plurality of actual primary subpixel brightness of the display panel, wherein each of the camera components is arranged to face the areas to be compensated;
    photographing, by the plurality of camera components, the display panel displaying the preset grayscale to obtain a plurality of actual secondary subpixel brightness of the display panel;
    calculating a plurality of front view compensation values of the areas to be compensated according to a primary subpixel target brightness and the plurality of actual primary subpixel brightness;
    determining a secondary subpixel target brightness according to the primary subpixel target brightness and a brightness relationship lookup table, wherein the brightness relationship lookup table comprises a plurality of primary subpixel brightness and a plurality of secondary subpixel brightness, each of the primary subpixel brightness and a corresponding one of the secondary subpixel brightness are configured to make the display panel have the same brightness under front and side viewing angles;
    calculating a plurality of side view compensation values of the areas to be compensated according to the secondary subpixel target brightness and the plurality of actual secondary subpixel brightness;
    compensating brightness of the primary subpixels in the areas to be compensated according to the plurality of front view compensation values; and
    compensating brightness of the secondary subpixels in the areas to be compensated according to the plurality of side view compensation values.

14. The brightness compensation device for the display panel according to claim 13, wherein to implement the step of photographing, by the plurality of camera components, the display panel displaying the preset grayscale to obtain the plurality of actual secondary subpixel brightness of the display panel, the processor further executes the computer program to implement following steps comprising:
    calculating the plurality of actual secondary subpixel brightness of the areas to be compensated according to a plurality of secondary subpixel brightness images of the areas to be compensated captured by some ones of the camera components other than some ones of the camera components facing the areas to be compensated.

15. The brightness compensation device for the display panel according to claim 14, wherein to implement the step of calculating the plurality of actual secondary subpixel brightness of the areas to be compensated according to the plurality of secondary subpixel brightness images of the areas to be compensated captured by some ones of the camera components other than some ones of the camera components facing the areas to be compensated, the processor further executes the computer program to implement following steps comprising:
    calculating a plurality of secondary subpixel brightness of the areas to be compensated according to the plurality of secondary subpixel brightness images of the areas to be compensated captured by some ones of the camera components other than some ones of the camera components facing the areas to be compensated; and
    selecting one of the plurality of secondary subpixel brightness having the largest difference with the secondary subpixel target brightness as the actual secondary subpixel brightness of a corresponding one of the areas to be compensated.

16. The brightness compensation device for the display panel according to claim 14, wherein to implement the step of compensating the brightness of the secondary subpixels in the areas to be compensated according to the plurality of side view compensation values, the processor further executes the computer program to implement following steps comprising:
    establishing a viewing angle-grayscale correspondence relationship table between viewing angles and grayscales of the areas to be compensated under a target brightness;
    establishing a distortion degree-viewing angle correspondence relationship table between distortion degrees of the areas to be compensated and the viewing angles;
    calculating distortion degrees of the secondary subpixel brightness images according to the secondary subpixel brightness images;
    calculating viewing angles of the camera components according to the distortion degrees and the distortion degree-viewing angle correspondence relationship table;
    calculating a plurality of secondary subpixel grayscale compensation values of the areas to be compensated according to the plurality of side view compensation values, the viewing angles of the camera components, and the viewing angle-grayscale correspondence relationship table; and
    compensating the brightness of the secondary subpixels in the areas to be compensated according to the plurality of secondary subpixel grayscale compensation values.

17. The brightness compensation device for the display panel according to claim 13, wherein to implement the step of calculating the plurality of side view compensation values of the areas to be compensated according to the secondary subpixel target brightness and the plurality of actual secondary subpixel brightness, the processor further executes the computer program to implement following steps comprising:
    according to the secondary subpixel target brightness and the plurality of actual secondary subpixel brightness, calculating the plurality of side view compensation values of the areas to be compensated based on a first brightness compensation formula, wherein the first brightness compensation formula is:

$$W_1 = N_1 * \text{center}_1 + (1 - N_1) * \text{other}_1,$$

where $W_1$ is one of the side view compensation values, $N_1$ is a weight coefficient of the secondary subpixel target brightness, $\text{center}_1$ is the secondary subpixel target brightness, and other is the actual secondary subpixel brightness.

18. The brightness compensation device for the display panel according to claim 13, wherein to implement the step of photographing, by the plurality of camera components, the display panel displaying the preset grayscale to obtain the plurality of actual primary subpixel brightness of the display panel, the processor further executes the computer program to implement following steps comprising:
  photographing, by the plurality of camera components, the display panel displaying the preset grayscale, wherein each of the camera components faces the areas to be compensated; and
  intercepting portions of a plurality of primary subpixel brightness images captured by the camera components, where each of the portions corresponds to an area where a corresponding one of the camera components is located;
  splicing the portions of the plurality of primary subpixel brightness images to obtain a frontal brightness image of the primary subpixels; and
  calculating the plurality of actual primary subpixel brightness of the areas to be compensated according to the frontal brightness image of the primary subpixels.

19. The brightness compensation device for the display panel according to claim 13, wherein to implement the step of calculating the plurality of front view compensation values of the areas to be compensated according to the primary subpixel target brightness and the plurality of actual primary subpixel brightness, the processor further executes the computer program to implement following steps comprising:
  according to the primary subpixel target brightness and the plurality of actual primary subpixel brightness, calculating the plurality of front view compensation values of the areas to be compensated based on a second brightness compensation formula,
  wherein the second brightness compensation formula is:

$$W_2 = N_2 * \text{center}_2 + (1 - N_2) * \text{other}_2,$$

where $W_2$ is one of the front view compensation values, $N_2$ is a weight coefficient of the primary subpixel target brightness, $\text{center}_2$ is the primary subpixel target brightness, and $\text{other}_2$ is the actual primary subpixel brightness.

20. The brightness compensation device for the display panel according to claim 13, wherein to implement the step of compensating the brightness of the primary subpixels in the areas to be compensated according to the plurality of front view compensation values, the processor further executes the computer program to implement following steps comprising:
  establishing a brightness-grayscale correspondence relationship table between primary subpixel brightness and grayscales of the areas to be compensated;
  calculating a plurality of primary subpixel grayscale compensation values of the areas to be compensated according to the plurality of front view compensation values and the brightness-grayscale correspondence relationship table; and
  compensating the brightness of the primary subpixels in the areas to be compensated according to the plurality of primary subpixel grayscale compensation values.

\* \* \* \* \*